United States Patent [19]

Gfeller et al.

[11] Patent Number: 4,523,824
[45] Date of Patent: Jun. 18, 1985

[54] DEVICE FOR A PHOTOGRAPHIC CAMERA

[75] Inventors: Karl Gfeller, Langwiesen; Peter Dätwyler, Diessenhofen, both of Switzerland

[73] Assignee: Sinar AG Schaffhausen, Feuerthalen, Switzerland

[21] Appl. No.: 610,984
[22] PCT Filed: Sep. 15, 1983
[86] PCT No.: PCT/CH83/00106
    § 371 Date: May 15, 1984
    § 102(e) Date: May 15, 1984
[87] PCT Pub. No.: WO84/01440
    PCT Pub. Date: Apr. 12, 1984

[30] Foreign Application Priority Data

Oct. 1, 1982 [CH] Switzerland ............. 5745/82

[51] Int. Cl.³ ............................................. G03B 17/44
[52] U.S. Cl. ............................................. 354/161
[58] Field of Search ............................. 354/161, 203

[56] References Cited

U.S. PATENT DOCUMENTS

| | | | |
|---|---|---|---|
| 304,406 | 9/1884 | Blair | 354/161 |
| 2,549,670 | 4/1951 | Dalton | 354/161 |
| 3,896,464 | 7/1975 | Galvin | 354/161 |
| 4,149,791 | 4/1979 | Van der Meer | 354/161 |

FOREIGN PATENT DOCUMENTS 939367 2/1956 Fed. Rep. of Germany .
514009 11/1920 France .

Primary Examiner—John Gonzales
Attorney, Agent, or Firm—Watson, Cole, Grindle & Watson

[57] ABSTRACT

A focusing-screen holder (13) provided with a focusing screen (14) is connected to a camera back (11) by means of springs (15). At least one cam plate (17) is located on the focusing-screen holder (13). This cam plate (17) can be swung between two end positions by means of an actuating handle (26) and cooperates with a slide face (22) of the camera back (11). In its first end position, cam plate (17) enables the focusing screen holder (13) to enter into abutting relation with the camera back (11) through the force of the springs (15). By swivelling the cam plate (17) to its second end position, the focusing-screen holder (13) is lifted off the camera back (11) against the force of the springs (15). The cam plate (17) has a radial cam (52) which is in abutting relation with an actuating pin (50). The latter is under the effect of a retarding mechanism (36) so that swivelling motions of the cam plate (17) from the second to the first end position are damped, dependent upon the actual velocity.

In this way, the focusing-screen holder (13), through the force of the springs (15), is prevented from impact striking the camera back (11) or a cassette containing a negative material inserted between the latter and the focusing-screen holder (13) and thereby from causing vibrations and damage.

13 Claims, 5 Drawing Figures

DEVICE FOR A PHOTOGRAPHIC CAMERA

This invention relates to a device designed for a photographic camera having a frame-type back which defines a bearing face for a photographic negative material or for a cassette containing said negative material, and having a pressure means located behind the camera back and movably connected thereto by means of springs that strive to urge said pressure means toward the bearing face of the camera back.

A device of the type mentioned above can for example be found in a cassette-loading camera for professional purposes. The pressure means which is connected to the camera back by means of springs can be lifted off the camera back against the force of the springs in order to insert a cassette containing the photographic negative material between the camera back and the pressure member. The purpose of the springs is to continually urge the pressure means toward the camera back so that the inserted cassette is in abutting relation with the bearing face of the camera back. To ensure that this occurs in any position of the camera even if, in a manner in itself known, auxiliary equipment such as, for example, a focusing screen and possibly other viewing accessories, are attached, the spring force acting on the pressure means must be relatively great. If, in a manner known from the prior art, the pressure means is at the same time designed as a focusing-screen holder for viewing and for sharp focusing, said springs also have the additional function of holding the pressure means in abutting relation with the bearing face of the camera back when the cassette is removed, such that the ground side of the focusing screen will lie in the same plane as the photosensitive layer of the photographic material in the cassette after the latter has been removed.

The relatively great spring force of the springs connecting the pressure means in the camera back has the disadvantage of rendering difficult the lifting of the pressure means off the camera back in order to insert the cassette containing the photographic negative material. Also, relatively high accelerations and correspondingly high speeds of movement result when the pressure means through the force of the springs return to the position for holding the inserted cassette in place or even to the position where it is in abutting relation with the camera back. When the pressure means strikes the inserted cassette or the camera back, this produces unwanted vibrations of the camera, harmful mechanical stresses within components, and disturbing noises.

Therefore, the major object of this invention is to provide a device of the type mentioned in the introduction to overcome the above drawbacks such that, without reducing the spring force that urges the pressure member against the camera back, the latter's impact upon the inserted cassette or upon the camera back is no longer a contributing factor.

According to the teachings of the invention, this object is achieved by the features defined in the claims.

The foregoing and other objects and advantages of the invention will appear more fully from the following description, made in connection with the accompanying drawings, of a preferred embodiment of the invention given solely by way of illustrative example FIG. 1 shows in side elevation a device as taught by the invention for a focusing-screen and cassette-loading camera, specifically in the position for viewing and focusing;

Figure 1:
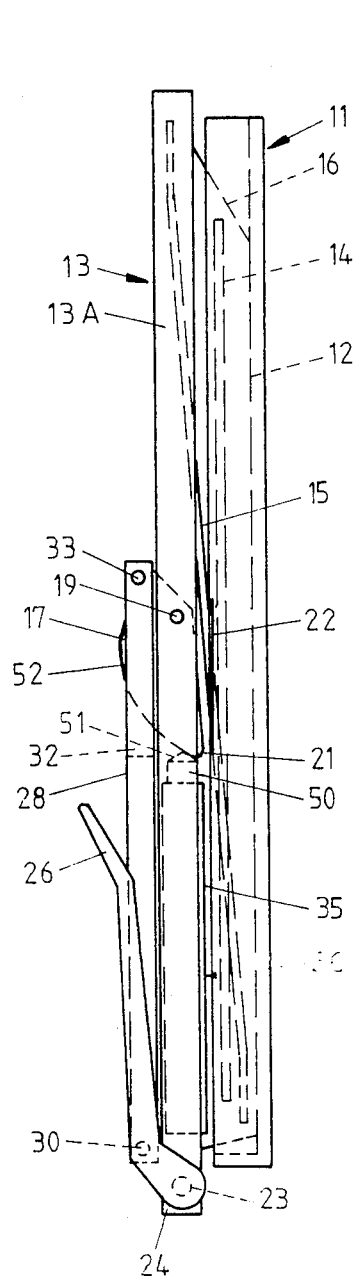

The focusing screen assembly for a large-size cassette-loading camera illustrated in FIGS. 1 to 4 has a frame-type camera back 11 defining a cassette bearing face 12 and a likewise frame-type focusing-screen holder 13 to which a focusing screen 14 is attached. Camera back 11 and focusing-holder 13 are connected together by means of two leaf springs 15, one end of each of which is attached to camera back 11 and the other end to focusing-screeen holder 13. Focusing-screen holder 13 is movably held in position by springs 15 on camera back 11. Springs 15 strive to continually urge focusing-screen holder 13 against camera back 11. There are provided on focusing-screen 13 supporting ribs 16 so formed as to matingly engage cassette-bearing face 12 for viewing and sharp focusing of the focusing-screen image and at the same time for fixing the distance from the ground surface of focusing-screen 14 to cassette-bearing face 12. Said distance, known in technical language as "focusing-screen or ground glass registering depth", corresponds to the so-called "film registering depth", i.e., the distance from the photosensitive surface of a photographic negative material contained in a cassette to the front face of the cassette.

On each of two opposed frame members 13A and 13B of focusing-screen holder 13, with springs 15 running parallel to each other along said frame members, a cam plate 17 or 18 is pivotably supported by means of an axle stub 19 or 20. The geometrical longitudinal axes of both axle stubs 19 and 20 are in line with one another, running parallel to focusing-screen 14 and each being located roughly midway along the length of the frame member 13A or 13B concerned. Cam plates 17 and 18 are each formed as a flat piece and penetrate a slotted perforation in the corresponding frame member. Both cam plates 17 and 18 are of identical shape and size and they each have a tapered end 21 intended to cooperate in sliding contact with a slide face 22 of camera back 11.

Along another frame member 13C of focusing-screen holder 13 there is provided a shaft 23 arranged to rotate freely in bosses 24 and 25 at two corners of the focusing-screen holder. To each end of shaft 23 there is attached a handle-type lever 26 which, by means of a guide rod 28 or 29, is operatively connected with cam plate 17 or 18. Guide rods 28 and 29 run substantially parallel to frame members 13A and 13B. At the articulated joint between guide rod 28 and lever 26 there is provided a joint pin 30 which is attached to lever 26 and engages in hole 31 in one of the two end portions of guide rod 28. The opposite end portion of guide rod 28 has a longitudinal slot 32 into which extends cam plate 17. For the articulated connection of cam plate 17 with guide rod 28 there is provided a hinge pin 33 which passes through holes in cam plate 17 and in the slotted end portion of guide rod 28 that lie along the same line. The articulated joints of the other guide rod 29 with the second lever 27 and with the second cam plate 18 are realized in like manner.

The arrangement described above makes it possible that when one or the other of the levers 26 and 27, which are identical in shape and in size, are actuated, cam plates 17 and 18 are swivelled simultaneously and equidirectionally. The rotational positions of both levers 26 and 27 and of both cam plates 17 and 18 are completely identical.

Figure 3:
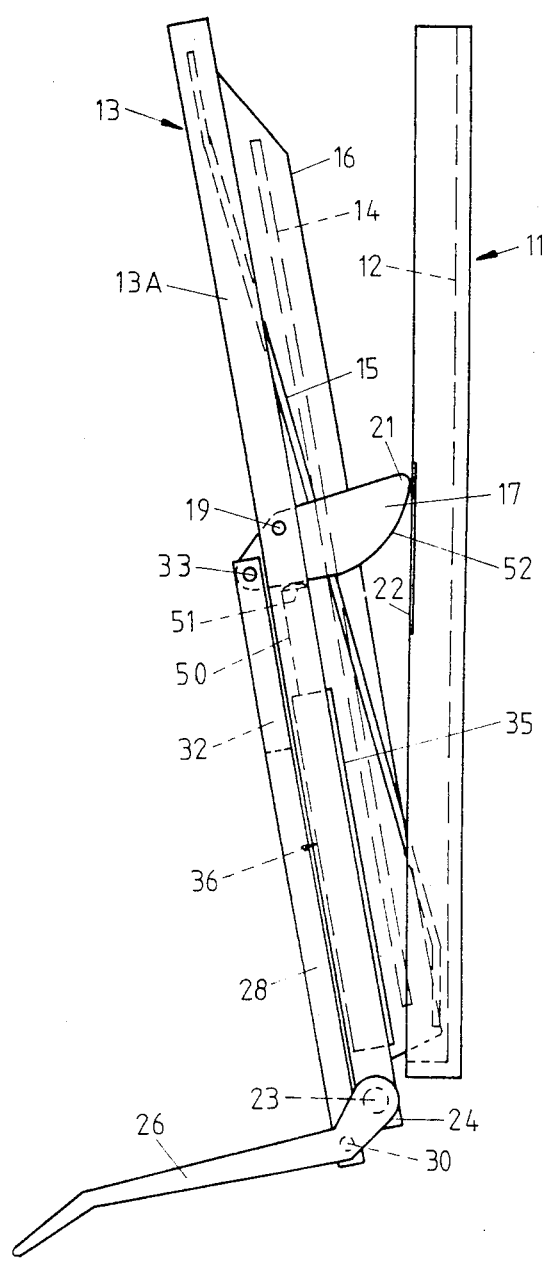
FIG. 3 is a side elevation of the device similar to FIG. 1 showing the position of the parts prepared for cassette insertion.

By actuating one of the handle-type levers 26 and 27, cam plates 17 and 18 can each be swung between two end positions. In the first end position, as shown in FIG. 1, cam plates 17 and 18 extend substantially parallel to frame members 13A and 13B of focusing-screen holder 13, with coincidental slight lifting of the tapered end 21 of each cam plate off the corresponding slide face 22 of camera back 11. Therefore, in this first end position, cam plates 17 and 18 enable the supporting ribs 16 of the focusing-screen frame to maintain a close bearing relation with cassette-bearing face 12. In the second end position, as illustrated in FIG. 3, cam plates 17 and 18 are swivelled through about 90 degrees as compared with the first end position, so that the cam plates extend substantially at right angles to frame members 13A and 13B of focusing-screen holder 13 and the tapered end 21 of each cam plate projects beyond supporting rib 16 of focusing-screen holder 13 and is propped against slide face 22 of camera back 11. Therefore, in this second end position of cam plates 17 and 18, focusing-screen holder 13 is lifted off camera back 11 against the force of springs 15, the position of cam plates 17 and 18 being so adjusted to each other that, through the force of springs 15, focusing-screen holder 13 assumes the inclined position relative to camera back 11 depicted in FIG. 3. In the first end position of cam plates 17 and 18 (FIG. 1), handle-type levers 26 and 27 each assume a position substantially parallel to frame members 13A and 13B of focusing-screen 13. Hereinafter, this position will be referred to as the neutral position. By contrast, in the second end position of cam plates 17 and 18 (FIG. 3), levers 26 and 27 each assume a position which is substantially perpendicular to frame members 13A and 13B of focusing-screen holder 13.

Figure 5:
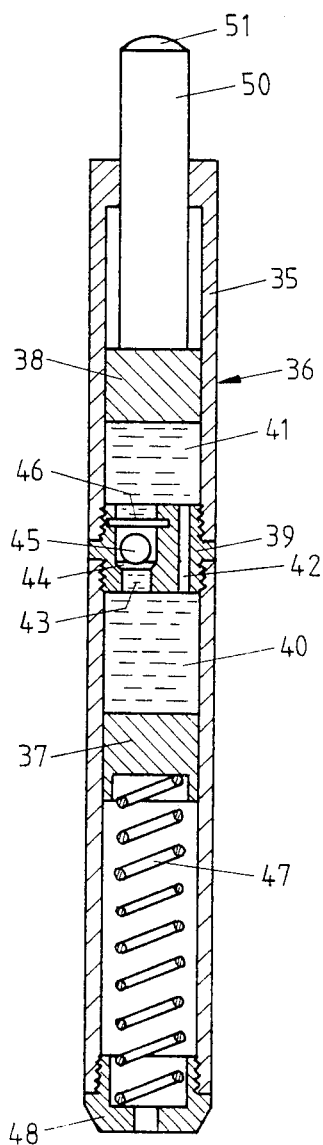
FIG. 5 shows, on a larger scale, a longitudinal section through a hydraulic damping means, which is a constituent part of the device depicted in FIGS. 1 to 4.

An elongated cylinder 35 is attached to frame member 13A of focusing-screen holder 13 such that its geometrical longitudinal axis runs parallel to the plane of the focusing screen and substantially radially to axle stub 19, about which cam plate 17 can be swivelled. Cylinder 35 is a constituent part of a hydraulic retarding means 36 which will now be described in detail with reference to FIG. 5.

Inside cylinder 35 there are provided a first piston 37 and a second piston 38 arranged to move in axial direction. Between pistons 37 and 38 there is disposed a component 39 which is fixedly connected to cylinder 35 and which divides the space between pistons 37 and 38 into two chambers 40 and 41. Component 39 has a first hole 42 with a relatively small passage area, and a second hole 43 with a considerably larger passage area. Chambers 40 and 41 communicate with one another through these holes 42 and 43. Hole 43 with the larger passage area is divided into two parts with different diameters, so that at the joint between the two parts an annular shoulder 44 is formed. In the part of the hole 43 with the larger diameter there is provided a ball element 45, which is capable of closing hole 43 by abutting against annular shoulder 44. A pin 46 is passed diametrically inwardly through the part of hole 43 containing ball element 45 so as to prevent the latter from leaving hole 43, but will nevertheless enable it to be lifted off annular shoulder 44. Both chambers 40 and 41 are filled with a hydraulic fluid. A relatively weak compression spring is inserted between piston 37 and an adjoining end piece 48 of cylinder 35. This spring strives to urge piston 37 towards stationary component 39. The other piston 38 is attached to one end of a piston rod 50 projecting from cylinder 35.

Figure 2:
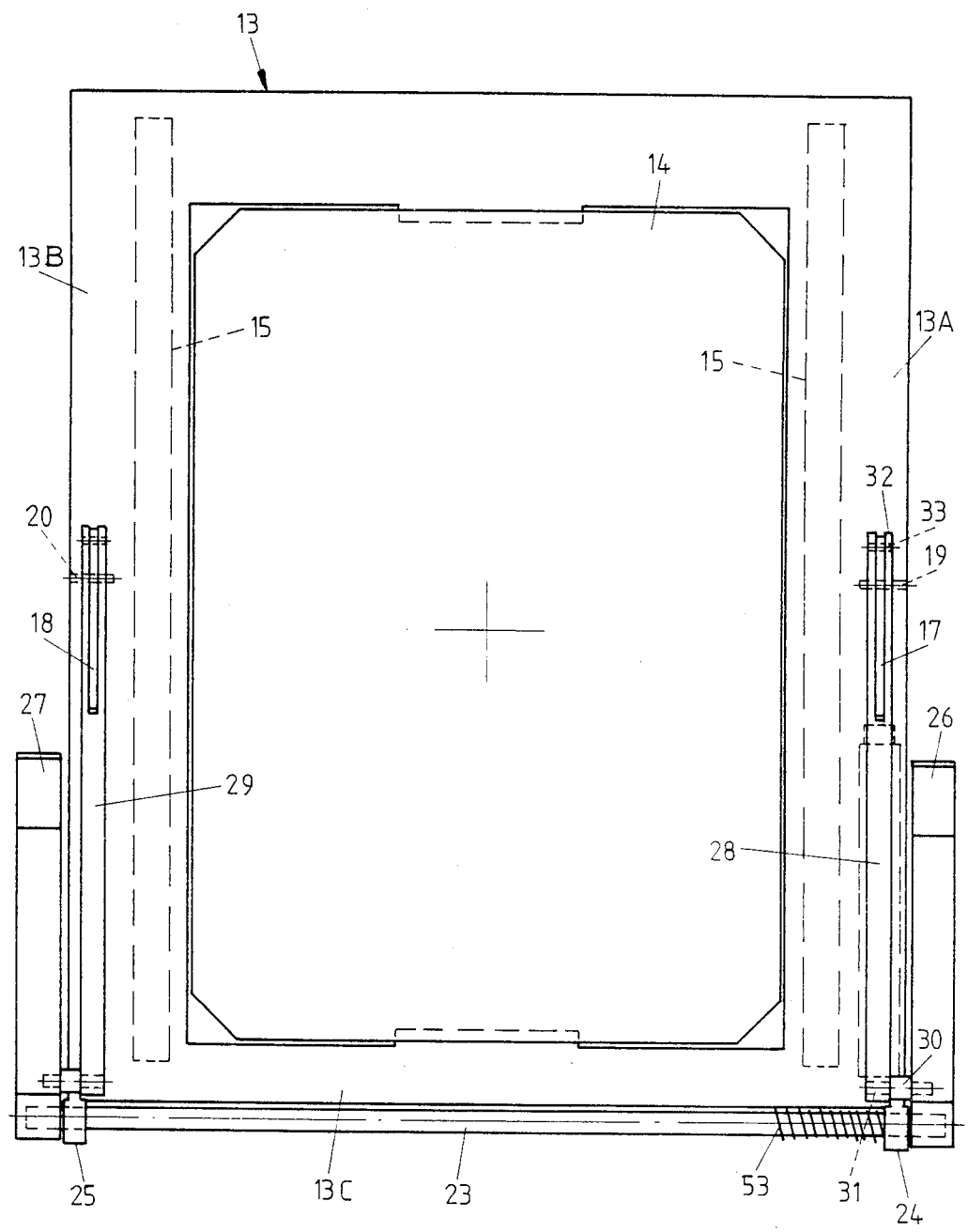
FIG. 2 is a view of the same device viewed from the left in FIG. 1.

The free end 51 of piston rod 50 turned away from piston 38 is intended to cooperate with a boundary edge of cam plate 17 designed as a radial cam 52 (FIGS. 1 to 3). When the end 51 of piston rod 50 serving as an actuating pin is without load, spring 47 pushes piston 37 toward stationary component 39, during which movement a portion of the fluid in chamber 40 is forced through holes 42 and 43 of component 39 into the other chamber 41. Under the higher pressure now prevailing in chamber 40, ball element 45 is lifted off annular shoulder 44 of hole 43 so as to enable the fluid to flow through the larger diameter hole 43 as well. The fluid entering chamber 41 causes a corresponding movement of the second piston 38 away from the stationary component 39, during which movement the free end 51 of piston rod 50 is pressed against radial cam 52 of cam plate 17. Since the fluid flows from chamber 40 into chamber 41 simultaneously through holes 42 and 43, this flow is subjected to only a relatively minor resistance. Therefore, a relatively weak pressure from spring 47 suffices to maintain the free end 51 of piston rod 50 in proper bearing contact with radial cam 52 of cam plate 17, independently of the actual swivelling position of cam plate 17.

When, upon actuation of one of the handle-type levers 26 and 27, cam plates 17 and 18 are swivelled from their second end position (FIG. 3) to their first end position (FIG. 1), piston rod 50 is forced into cylinder 35 by means of radial cam 52 of cam plate 17. Thereby, piston 38 is moved towards stationary component 39 in the cylinder, resulting in a reduction of the volume of chamber 41. Therefore, a portion of the fluid in chamber 41 is forced through the smaller-diameter hole 42 into the other chamber 40. The fluid is prevented from flowing out of chamber 41 through hole 42 with the larger passage area by ball element 45, since the latter is pressed toward annular shoulder 44 by the higher pressure now prevailing in chamber 41 with the object of blocking the passage of the fluid through hole 43. Consequently, the fluid flow from chamber 41 to chamber 40 is subjected to a considerably higher resistance than the flow in the opposite direction. As a result, the movement of piston 38, piston rod 50 and, finally, cam plate 17 is considerably checked or damped. The damping that opposes the movement is the greater, the higher the speed of movement, i.e., a dynamic damping of motion results. The fluid entering chamber 40 causes a corresponding movement of piston 37 away from component 39, in the course of which spring 47 is increasingly compressed. The force of spring 47 also contributes, be it to a lesser degree, to the checking of the movement of piston 38 towards component 39.

Advantageously, radial cam 52 is designed as a spiral, so it can be expressed by the formula:

$$r = a \cdot e^{b\phi}$$

where r = variable radius of the radial cam, measured from the geometrical swivelling axis of cam plate 17, a = distance of the part of the radial cam cooperating with the free end 51 of piston rod 50 serving as an actuating pin from the geometrical axis of rotation of cam plate 17 or 18, when the cam plate is in its second end position (FIG. 3), b = a constant, and φ = angle of rotation of cam plate 17 moving from its second end position to its first end position.

Advantageously, by designing the radial cam in conformity with the above formula, at each point of contact between the free end 51 of piston rod 50 and radial cam 52 of cam plate 17 the prevailing tangent of the radial cam can have the same angle relative to the longitudinal axis of the piston rod. This means that the directions of the vector of force in any swivelling position of cam plate 17 are the same.

Figure 4:
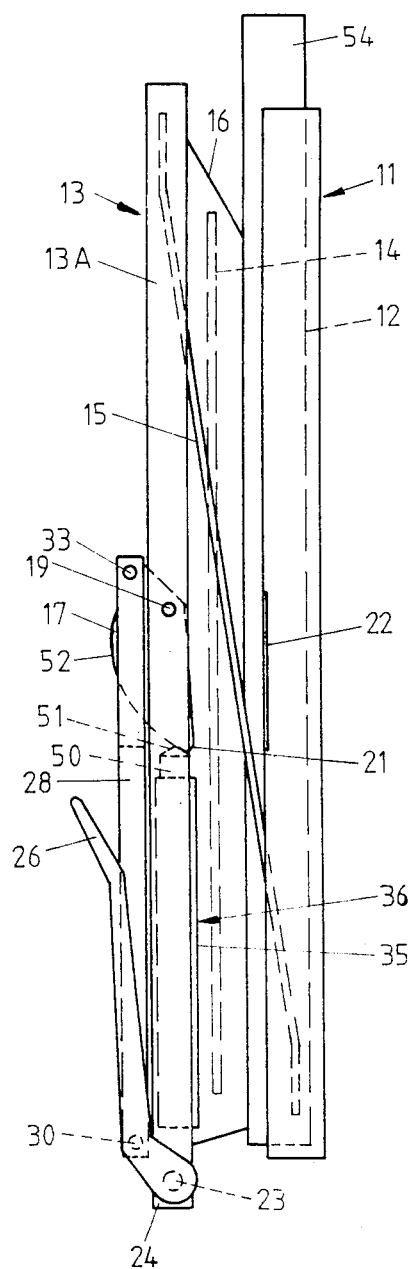
FIG. 4 shows the same device together with a cassette inserted in the shooting position, likewise in side elevation similar to FIG. 1.

Shaft 23 is surrounded by a helical spring 53 (FIG. 2) which is anchored with one of its end to shaft 23 and acts with its other end upon focusing-screen holder 13. The purpose of spring 53 is to apply to shaft 23 a relatively weak torque in clockwise direction, as shown in FIG. 1, in order to keep the handle-type levers 26 and 27 in their neutral position (FIGS. 1 and 4).

The focusing-screen holder described and illustrated herein is used and operated as follows:

It is assumed that camera back 11 is combined with other camera parts (not shown) into a photographic camera, in particular bellows, camera front part, and lens. For focusing-screen (14) viewing and for the sharp focusing of the focusing-screen image, handle-type levers 26 and 27 must be in the neutral positions depicted in FIGS. 1 and 2. Swivel-mounted cam plates 17 and 18 are each located in their first end position shown in FIG. 1, where the tapered end 21 of each cam plate is lifted slightly off camera back 11 and supporting ribs 16 of focusing-screen holder 13 bear directly against cassette-bearing face 12 of camera back 11 due to the force of springs 15. Levers 26,27 and cam plates 17,18 are held in the positions described above by the force of helical spring 53 surrounding shaft 23. Piston rod 50 is pushed to the maximum by radial cam 52 of cam plate 17 into cylinder 35. The thereby compressed spring inside cylinder 35 applies a certain torque to cam plate 17 in counterclockwise direction (FIG. 1). However, this torque is less than that acting in the opposite direction and produced by helical spring 53.

When the photographer desires to insert a standard cassette with photosensitive photographic negative material between camera back 11 and focusing-screen holder 13, he first swings one or both of handle-type levers 26 and 27 through about 90 degrees to the position shown in FIG. 3. Thereby, the two cam plates 17 and 18 are likewise swung equidirectionally through about 90 degrees to the second end position directed in FIG. 3 by guide rods 28 and 29. During this movement, the tapered end 21 of each cam plate 17 and 18 is supported against the corresponding slide face 22 of camera back 11 and slides therealong. As a result, focusing-screen holder 13 is lifted off camera back 11 against the force of springs 15 until it assumes the position shown in FIG. 3. A substantially wedge-shaped interspace now exists between camera back 11 and focusing-screen holder 13, which enables the cassette to be inserted. During the rotation of cam plates 17 and 18, the free end 51 of piston rod 50 remains continuously in abutting relation with radial cam 52 of cam plate 17 because of the force of spring 47 inside cylinder 35, as has already been explained with reference to FIG. 5. It should be noted that in the second end position of cam plates 17 and 18 the tapered ends 21 thereof are moved upwards slightly beyond their dead center position in FIG. 3. In this way, it is ensured that this end position of cam plates 17 and 18 persists when the photographer lets go of lever(s) 26 and/or 27.

The photographer can now insert a cassette 54 (FIG. 4) into the interspace between camera back 11 and focusing-screen holder 13. He then swivels back one of the handle-type levers 26 and 27 slightly towards its neutral position, so that cam plates 17 and 18 are correspondingly rotated back from their second end position to their first end position and the tapered ends 21 of the cam plates are returned through their dead center position. Focusing-screen holder 13 is pushed forcefully against the back of cassette 54 by the force of springs 15, so that eventually the front side of the cassette is urged against the cassette-bearing face 12 of camera back 11. In this way, cam plates 17 and 18 in cooperation with retarding device 36 prevent focusing-screen holder 13 from hard or impact striking the inserted cassette 54 because, when cam plates 17 and 18 are rotated from their second end position to their first end position, piston rod 50, through the action of radial cam 53 of cam plate 17, will be pushed into cylinder 53, thereby moving piston 38 (FIG. 5) to stationary component 39 in cylinder 35. As described above, the hydraulic fluid in cylinder 35 offers a resistance to this movement which is dependent upon the velocity of movement, so that the swivelling movement of cam plates 17 and 18 and, eventually, also the movement of the focusing-screen holder to the inserted cassette 54, are subjected to a corresponding amount of damping, resulting in a gentle approach of focusing-screen holder 13 to cassette 54. Finally, through the force of helical spring 23 surrounding shaft 23, levers 26,27 are rotated back to their neutral position and cam plates 17,18 to their first end position (FIG. 4).

To remove cassette 54 from camera back 11, the photographer first once again actuates at least one of the levers 26 and 27 so that cam plates 17 and 18 are swivelled from their first end position to their second end position. As soon as the tapered ends 21 of cam plates 17 and 18 come into contact with the corresponding slide faces 22 of camera back 11, focusing-screen holder 13 is lifted off the back of cassette 54 upon further rotation of levers 26,27 and of cam plates 17,18. When cam plates 17,18 have reached their second end position (FIG. 3), cassette 54 can be readily withdrawn from the interspace between camera back 11 and focusing-screen holder 13.

When the photographer wishes to bring the focusing-screen holder 13 from the position where it is lifted off the camera back (FIG. 3) to the basic position depicted in FIG. 1, all he has to do is to swing back at least one of the handle-shaped levers 26 and 27 to its neutral position until the tapered end 21 of each cam plate 17 and 18 is returned from the second end position through the dead center position. Thereupon, springs 15 enable focusing-screen holder 13 to move by themselves against camera back 11, during which movement cam plates 17 and 17 are swung to their first end position, but the swivelling movement of the cam plates is dynamically damped by means of radial cam 52 of cam plate 17, piston rod 50, and braking device 36, as described earlier. In this manner, a severe impact of focusing-screen holder 13 upon camera back 11 is avoided. By properly dimensioning and shaping cam plates 17,18, radial cam 52, and retard-means 36, ribs 16 of focusing-screen holder 13 can be caused to settle gently on the cassette-bearing face.

It will be obvious to those skilled in the art that the embodiment described herein can be modified in various ways. Thus, for example, it is possible to assign a retarding means 36 not only to cam plate 17, but also to the second cam plate 18, it being advisable to design both retarding means for cam plates 17 and 18 in like manner. Likewise, either levers 26 and 27 can be shortened such that it can no longer be used as a handle for operating the devive. Also, at least one of cam plates 17,18 can itself be provided with a rearward extension which serves as operating handle. Numerous other modifications of braking device 36 are possible. In particular, a gaseous pressure medium can be used instead of a fluid pressure medium. Finally, swivel-mounted cam plates 17,18, levers 26,27, and guide rods 28,29 can be so arranged on camera back 11, instead of on the focusing-screen holder 13, that the cam plates cooperate in sliding contact on a slide face on the focusing-screen holder.

In every case, it is of advantage to realize the transfer of motion from cam plate 17 to retarding means 36 in the manner described above by means of radial cam 52 and the actuating pin 50 in sliding contact therewith, because in this manner, in view of the space conditions unlike, say, a direct system of levers, an optimal transfer function between the movements of focusing-screen holder 13 and those of actuating pin 50 can be achieved.

The invention can likewise be applied to devices in which, instead of focusing-screen holder 13, a differently shaped pressure member is provided, for example, in the form of an opaque back whose only function is to press a cassette inserted between it and the camera back 11, or, if so desired, only a photographic negative material, against the bearing face of camera back 11 through the force of springs 15.

We claim:

1. A device designed for a photographic camera, having a frame-type camera back which defines a bearing face for a photographic negative material or for a cassette containing said negative material, and having a pressure means located behind said camera back and movably connected thereto by means of springs that strive to force said pressure means toward said bearing face of said camera back, characterized by at least one retarding means (17–52) to damp movements of said pressure means (13) through the force of said springs, dependent upon the actual speed of movement.

2. The device as set forth in claim 1, characterized in that said retarding means (17–52) has a cam plate (17) which can be swivelled about a swivelling axis (19) parallel to said bearing face of said camera back on one of the components: camera back (11) and pressure means (13), and has an end portion (21) turned away from said swivelling axis (19), said cam plate (17) being in sliding contact with the other of said components by means of said end portion (21), further characterized in that said cam plate (17) can be swung between two end positions, whereby in the first end position said cam plate (17) enables said pressure means (13) to bear against said bearing face (12) of said camera back (11), and in the second end position said cam plate (17) holds said pressure means (13) in a position remote from said camera back (11) so as to enable a photographic negative material or a cassette (54) containing the latter to be inserted between said camera back (11) and said pressure means (13), and whereby said cam plate (17) is operatively connected with a retarding mechanism (36) so as to damp the swivelling movement of said cam plate (17) from its second end position to said first end position.

3. The device as set forth in claim 2, characterized in that said cam plate (17) has a radial cam (52) which is in sliding contact with an actuating pin (50) which is under the effect of said retarding mechanism (36), that the portion (51) of said actuating pin (50) cooperating with said radial cam (52) can move at least substantially radially to said swivelling axis (19) of said cam plate (17) and, through the force of an auxiliary spring (47), is held permanently in abutting relation with said radial cam (52), and that said retarding mechanism (36) is further designed such that said actuating pin (50), in a direction away from said swivelling axis (19) of said cam plate (17), can only be moved by overcoming a damping effect, whereas in reverse direction it can be moved practically without a damping effect.

4. The device as set forth in claim 3, characterized in that said radial cam (52) of said cam plate (17) is defined at least approximately by the formula:

$$r = a \cdot e^{b\phi}$$

in which:
r = variable radius of said radial cam (52) measured from the geometrical swivelling axis of said cam plate (17),
a = distance from the portion of said radial cam (52) cooperating with said actuating pin (50) to the geometrical swivelling axis when said cam plate (17) is in its second end position,
b = constant factor,
$\phi$ = angle of rotation of said cam plate (17) measured from its second end position to its first end position.

5. The device as set forth in claim 3, characterized in that said retarding mechanism (36) has a cylinder (35) and a piston (38) movable therein and connected to the other end of said actuating pin (50) forming a piston rod, that in said cylinder (35) there is provided at least one chamber (41) containing a liquid or a gaseous pressure medium and having a volume that can be varied by moving said piston (38), and further characterized in that a wall section (39) defining said chamber (41) has at least one through-port (42,43) for said pressure medium and at least one one-way valve (44,45) for automatically closing at least a part (43) of said through-port against the passage of said pressure medium in one direction.

6. The device as set forth in claim 5, characterized in that said pressure means (13) has the form of a frame and that said cylinder (35) of said retarding mechanism is attached to a frame member (13A) of said pressure means (13) or of said camera back (11), the longitudinal axis of said cylinder (35) running parallel to the longitudinal direction of said frame member (13A) and substantially radially to said swivelling axis (19) of said cam plate (17).

7. The device as set forth in claim 2 characterized in that said cam plate (17) is operatively connected to a handle-type lever (26) for the swivelling of said cam plate (17) at least from its first to its second end position.

8. The device as set forth in claim 7, characterized in that said handle-type lever (26) can be swivelled about an axis (23) running parallel to said swivelling axis (19)

of said cam plate (17) and coupled thereto by means of a guide rod (28), and that said swivelling axis (19) of said cam plate (17) is located substantially midway along the length of a frame member (13A) of said camera back (11) or of said pressure means (13), while a bearing (24) for the shaft (23) of said handle-type lever (26) is located at one end of said frame member (13A), said guide rod (28) running substantially parallel to said frame member (13A).

9. The device as set forth in claim 8, characterized in that on another frame member (13B) of said pressure means (13) or of said camera back (11) lying opposite to said frame member (13A), a second cam plate (18) can be swivelled about a second swivelling axis (20) which is aligned with that of said first cam plate (17), that said second cam plate (18) has an end portion turned away from its swivelling axis (20), by means of which said second cam plate (18) is likewise in sliding contact with said other component of the components (camera back) (11) and pressure means (13), and that said second cam plate (18) is coupled by means of a second guide rod (29) to another lever (27) which is operatively connected to said handle-type lever (26), such that both said cam plates (17,18) always assume corresponding rotating positions.

10. The device as set forth in claim 9, characterized in that said other lever (27) is likewise shaped like a handle whose shape, size, and swivelling position are the same as those of said first handle-type lever (26).

11. The device as set forth in claim 9, characterized in that said second cam plate (18) has the same shape and size as said first cam plate (17) and that a retarding mechanism is likewise assigned to said second cam plate (18), said retarding mechanism having the same structure and the same arrangement as said retarding mechanism (36) assigned to said first cam plate (17).

12. The device as set forth in claim 7, characterized in that another auxiliary spring (5) is assigned to said handle-type lever (26,27), said other auxiliary spring (53) striving to swivel said lever (26,27) to a neutral position in which said cam plate (17,18) assumes its first end position.

13. The device as set forth in claims 1 or 2, characterized in that said pressure means (13) holds a focusing-screen (14).

* * * * *